(12) United States Patent
Qu et al.

(10) Patent No.: US 9,838,595 B2
(45) Date of Patent: Dec. 5, 2017

(54) VIDEO GENERATING METHOD AND APPARATUS OF VIDEO GENERATING SYSTEM

(71) Applicant: SZ REACH TECH CO., LTD., Shenzhen, Guangdong (CN)

(72) Inventors: Xin Qu, Guangdong (CN); Hai Liao, Guangdong (CN); Xinglei Sun, Guangdong (CN); Jie Yuan, Guangdong (CN); Chong Xu, Guangdong (CN); Zhen Qian, Guangdong (CN)

(73) Assignee: SZ REACH TECH CO., LTD., Shenzhen, Guangdong (CN)

( * ) Notice: Subject to any disclaimer, the term of this patent is extended or adjusted under 35 U.S.C. 154(b) by 242 days.

(21) Appl. No.: 14/888,627

(22) PCT Filed: Nov. 10, 2014

(86) PCT No.: PCT/CN2014/090703
§ 371 (c)(1),
(2) Date: Nov. 2, 2015

(87) PCT Pub. No.: WO2016/074123
PCT Pub. Date: May 19, 2016

(65) Prior Publication Data
US 2016/0344928 A1 Nov. 24, 2016

(51) Int. Cl.
*H04N 5/232* (2006.01)
*H04N 5/247* (2006.01)
(Continued)

(52) U.S. Cl.
CPC ......... *H04N 5/23219* (2013.01); *G06T 7/254* (2017.01); *H04N 5/232* (2013.01);
(Continued)

(58) Field of Classification Search
CPC ............... H04N 5/23219; H04N 5/232; H04N 5/23245; H04N 5/23296; H04N 5/247;
(Continued)

(56) References Cited

U.S. PATENT DOCUMENTS

2015/0371082 A1* 12/2015 Csaszar .............. G06K 9/00355
382/103

FOREIGN PATENT DOCUMENTS

| CN | 2896731 | 5/2007 |
|---|---|---|
| CN | 103164991 | 6/2013 |
| CN | 103777643 | 5/2014 |

* cited by examiner

*Primary Examiner* — Thai Tran
*Assistant Examiner* — Christopher T Braniff
(74) *Attorney, Agent, or Firm* — Hamre, Schumann, Mueller & Larson, P.C.

(57) ABSTRACT

The present invention belongs to the technical field of video recording and provides a video generating method and apparatus of a video generating system, the video generating system comprises a system target orientating camera, a target tracking camera and a panorama camera, the method comprises: when it is judged that a target object included in the image collected by the target tracking camera is a person, and the person lies within a scope of a lens of the target tracking camera, switching the target tracking camera such that it serves as a video generating source and generating a video according to images collected by the target tracking camera; when it is judged that the target object included in an image collected by the target tracking camera is a person, and the person lies out of the scope of the lens of the target tracking camera, or it is judged that the target object included in an image collected by the target tracking camera is not a person, switching the panorama camera such that it serves as the video generating source and generating a video according to the images collected by the panorama camera.

(Continued)

Automatic control for switching among different cameras to collect images and generate videos is achieved, so that accurate tracking for any target object and accurate switching among different cameras can be done, and automatic switching among different cameras during a video generating process is realized; in this way, there is no need to perform operation and manual intervention after installation and debugging are accomplished.

10 Claims, 5 Drawing Sheets

(51) Int. Cl.
    *H04N 5/268*     (2006.01)
    *G06K 9/00*     (2006.01)
    *G06T 7/254*     (2017.01)

(52) U.S. Cl.
    CPC ..... *H04N 5/23245* (2013.01); *H04N 5/23296* (2013.01); *H04N 5/247* (2013.01); *H04N 5/268* (2013.01); *G06K 9/00221* (2013.01); *G06T 2207/10016* (2013.01); *G06T 2207/30196* (2013.01); *G06T 2207/30201* (2013.01)

(58) Field of Classification Search
    CPC ................... H04N 5/268; G06T 7/254; G06T 2207/10016; G06T 2207/30196; G06T 2207/30201; G06K 9/00221
    See application file for complete search history.

VIDEO GENERATING METHOD AND APPARATUS OF VIDEO GENERATING SYSTEM

TECHNICAL FIELD

The present application relates to the technical field of video recording, and more particularly, relates to a video generating method and apparatus of a video generating system.

BACKGROUND

With the development of technology and the progress of the society, using a camera system to track an object and generates a video has already been universal. In an existing camera system, switching between a distant view and a nearby view for a single camera or switching among different cameras is usually controlled by manual methods, thus, at least one person is needed for being on duty during a video generating process, and operational errors may be brought during manual switching processes.

To sum up, the prior art can't achieve intelligent switching for recording and broadcasting among different cameras during processes of tracking targets and generating videos through the cameras.

BRIEF SUMMARY

A purpose of the present application is to provide a video generating method and apparatus of a video generating system, which are configured for solving the problem in the prior art that it is still unable to achieve intelligent switching for recording and broadcasting among different cameras during processes of object tracking and video generating through the cameras.

In one aspect, the present invention provides a video generating method of a video generating system, the system comprises a system target orientating camera, a target tracking camera and a panorama camera, the method comprises:

obtaining at least one image collected by the system target orientating camera;

judging whether the image collected by the system target orientating camera includes a target object;

when the collected image include the target object, confirming a coordinate position where the target object lies in a current photographing space;

controlling the holder of the target tracking camera to move according to the coordinate position such that the target object can be tracked by the target tracking camera and at least one image collected by the target tracking camera can be obtained simultaneously;

judging whether the target object included in the collected image is a person;

when it is judged that the target object included in the image collected by the target tracking camera is a person, and the person lies within a scope of a lens of the target tracking camera, switching the target tracking camera such that the system target orientating camera serves as a video generating source and generating video according to the images collected by the target tracking camera;

when it is judged that the target object included in the image collected by the target tracking camera is a person, and the person lies out of a scope of a lens of the target tracking camera, or when it is confirmed that the target object included in the image collected by the target tracking camera is not a person, switching the panorama camera such that the panorama camera serves as a video generating source and generating video according to the images collected by the panorama camera.

In a second aspect, the present invention provides a video generating apparatus of a video generating system, the video generating apparatus comprises:

an obtaining unit configured for obtaining at least one image collected by a system target orientating camera;

a first judging unit configured for judging whether the image collected by the system target orientating camera includes a target object;

a position confirming unit configured for confirming a coordinate position where the target object lies in a current photographing space when the collected image includes the target object;

a tracking unit configured for controlling a holder of the target tracking camera to move according to the coordinate position such that the target object can be tracked by the target tracking camera and at least one image collected by the target tracking camera can be obtained simultaneously;

a second judging unit configured for judging whether the target object included in the image collected by the target tracking camera is a person;

a first switching unit configured for switching the target tracking camera such that the system target orientating camera serves as a video generating source and generating a video according to the images collected by the target tracking camera when it is judged that the target object included in a collected image is a person, and the person lies within a scope of a lens of the target tracking camera;

a second switching unit configured for switching the panorama camera such that the panorama camera serves as a video generating source and generating a video according to the images collected by the panorama camera when the target object included in the collected image is a person, and the person lies out of a scope of a lens of the target tracking camera, or when it is confirmed that the target object included in the collected image is not a person.

In the embodiment of the present invention, the position of the target object is confirmed according to the images collected by the system target orientating camera and whether the target object is a human being is judged via the target tracking camera, when it is judged that the target object included in the image collected by the target tracking camera is a person and the person lies within the scope of the lens of the target tracking camera, the target tracking camera is automatically switched to serve as the video generating source and generating video according to the images collected by the target tracking camera, when it is judged that the target object included in the images collected by the target tracking camera is a person and the person lies out of the scope of the lens of the target tracking camera, the panorama camera is automatically switched to serve as the video generating source and generating video according to the images collected by the panorama camera. In this way, different cameras can be automatically switched during a process of video recording, so that smoothly switched videos can be obtained, and there is no need to perform operation and manual intervention for the video generating system after installation and debugging for the video generating system are accomplished.

BRIEF DESCRIPTION OF THE DRAWINGS

In order to explain the embodiments of the present invention clearly, a brief introduction regarding the accompanying drawings that need to be used for describing the embodiments is given below; it is obvious that the accompanying drawings described as follows are only some embodiments of the present invention, for those skilled in the art, some other drawings can also be obtained according to the current drawings on the premise of paying no creative labor.

DETAILED DESCRIPTION OF THE PREFERRED EMBODIMENT

In order to make the purpose, the technical features and the advantages of the present application be more clear, the present application will be described in detail with reference to the accompanying drawings and embodiments. It should be understood that the specific embodiments described herein are used for interpretation of present invention merely, rather than the limitation to the present invention.

Figure 1:
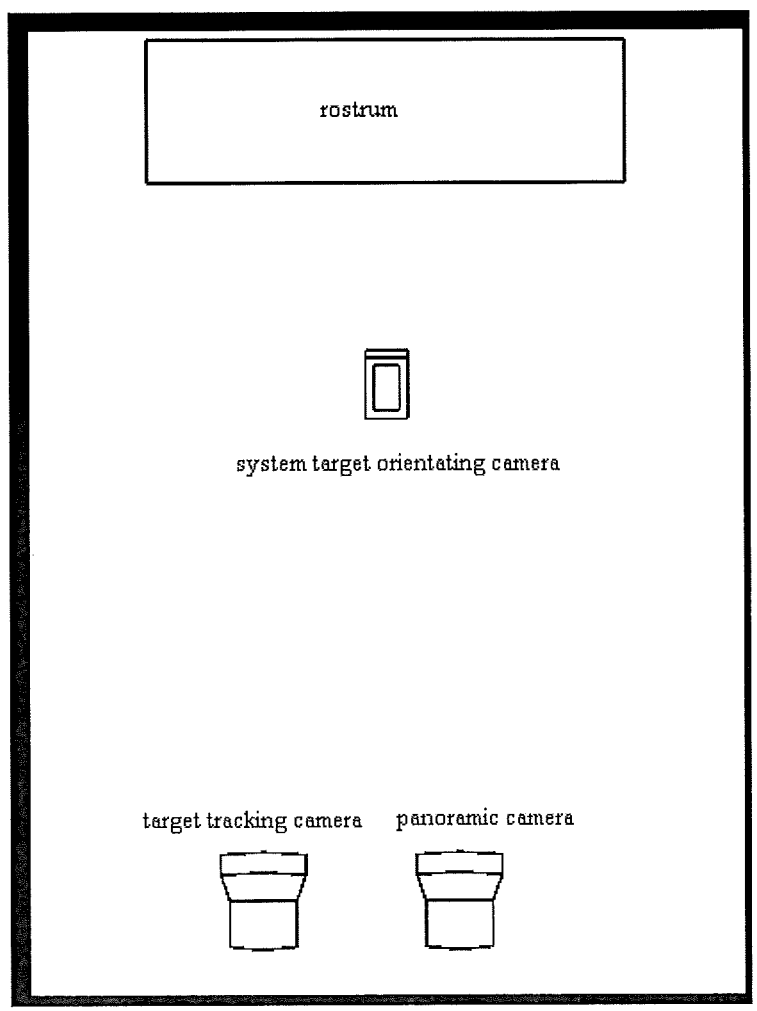
FIG. 1 illustrates a structural schematic diagram of a video generating system in a classroom scene according to one embodiment of the present invention.

The application scenes of the embodiment of the present invention can be the scenes where a plurality of cameras are used to track an object and generates videos, e.g., a scene of a classroom in a school, a training room of a training institute, and so on. Please refer to FIG. 1, which illustrates a schematic diagram of a video generating system in a classroom scene, the video generating system comprises a system target orientating camera, a target tracking camera and a panoramic camera, wherein, the system target orientating camera can be mounted on the ceiling above a center of a classroom, and the orientation of the system target orientating camera faces a rostrum in the classroom. The target tracking camera and the panoramic camera are positioned respectively at the back of the classroom. Besides, before video data is generated, it is required to confirm the following data, i.e., the lens parameters of the system target orientating camera; the relationship between the pixels of the lens of the system target orientating camera and the visual angle of the lens, that is, the degree of the visual angle determined by the distance between the pixels in a horizontal direction of the system target orientating camera; the height of the system target orientating camera and distance between the system target orientating camera and the rostrum; the height of the target tracking camera and the distance between the target tracking camera and the rostrum. The video generating system analyses the images collected by the system target orientating camera, the target tracking camera and the panoramic camera by the combination of means including target detecting, trigonometry conversion, lens switching, and so on, so that the videos that track targets intelligently and are switched smoothly are generated under unattended circumstance can be achieved.

The implementation of the present invention is described in detail with reference to the following embodiments:

The First Embodiment

Figure 2:
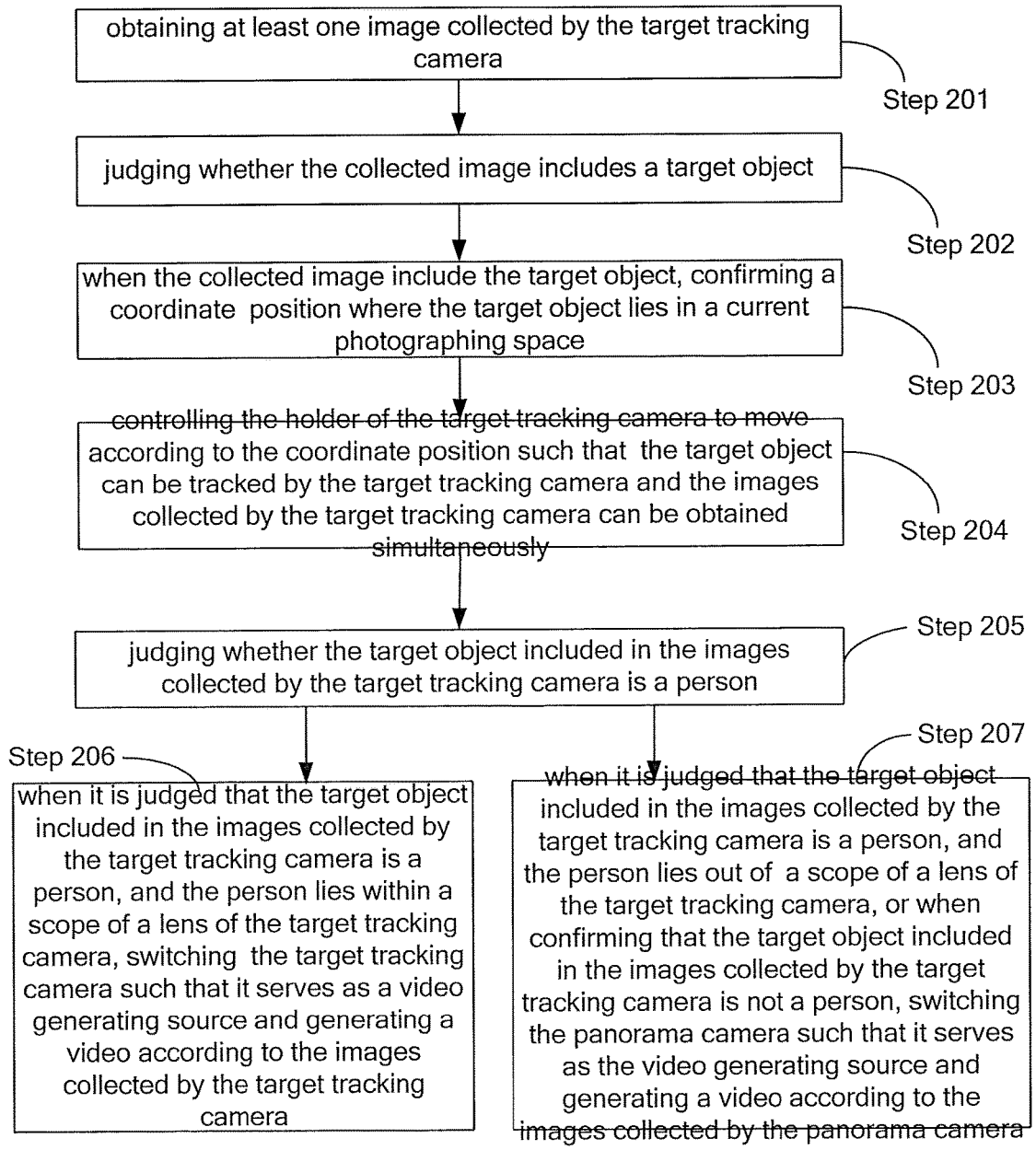
FIG. 2 illustrates a flow chart for implementing a video generating method of a video generating system according to a first embodiment of the present invention.
Figure 3:
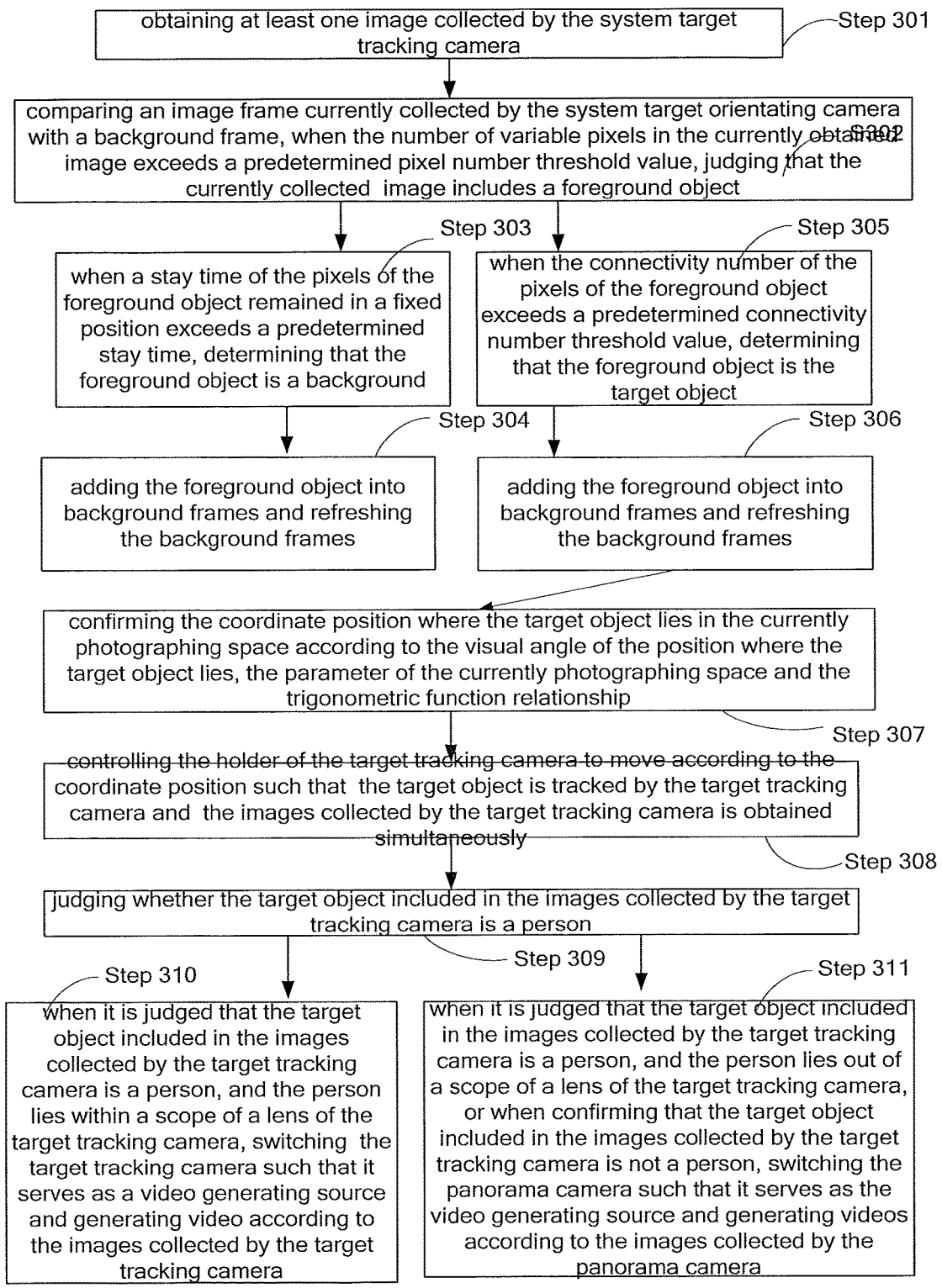
FIG. 3 illustrates a flow chart for implementing a video generating method of a video generating system according to a second embodiment of the present invention.

FIG. 2 illustrates a flow chart of the implementation of a video generating method of the video generating system provided by the first embodiment of the present invention, the video generating system comprises a system target orientating camera, a target tracking camera and a panoramic camera, wherein, a suspicious object can be found via the system target orientating camera, images can be collected via the system target orientating camera and the target tracking camera and image analysis for the images can be performed to confirm whether the suspicious object is a person, by which the disturbances caused by other objects can be excluded, and images collected from different cameras can be controlled to be automatically switched and thereby generate a video, so that accurate tracking and switching for a target are realized. The method is explained in detail as follows:

step 201, obtaining at least one image collected by the system target orientating camera;

step 202, judging whether the image collected by the system target orientating camera includes a target object;

whether the collected image includes the target object can be confirmed via performing a further analysis for the image collected by the system target orientating camera, in order to exactly confirm that the target object orientated by the system target orientating camera is a person, the target object is further tracked via the target tracking camera to confirm whether the target object is a person, the detail of the process is as follows:

step 203, when the image collected by the system target orientating camera includes the target object, confirming the position where the target object lies in a current photographing space.

step 204, controlling a holder of the target tracking camera to move according to the position where the target object lies in the current photographing space for tracking the target object via the target tracking camera and obtaining at least one image collected by the target tracking camera simultaneously;

step 205, judging whether the target object included in the image collected by the target tracking camera is a person;

step 206, when it is confirmed that the target object included in an image collected by the target tracking camera is a person and the person lies within a scope of a lens of the target tracking camera, switching to the target tracking camera such that it serves as a video generating source and generating a video according to the images collected by the target tracking camera;

step 207, when it is confirmed that the target object included in the image collected by the target tracking camera is a person and the person lies out of a scope of a lens of the target tracking camera, or when it is confirmed that the target object included in the image collected by the target tracking camera is not a person, switching the panoramic camera such that it serves as a video generating source and generating a video according to the images collected by the panoramic camera;

In the embodiment of the present invention, the target object is confirmed via the images collected by the system target orientating camera, and whether the target object is a person is judged via the target tracking camera, when it is judged that the target object included in the image collected by the target tracking camera is a person and the person lies within the scope of the lens of the target tracking camera, automatically switching the target tracking camera such that it serves as the video generating source and generating a video according to the target tracking camera, when the target object included in the image collected by the target tracking camera is a person and the person lies out of the scope of the lens of the target tracking camera, or when it is confirmed that the target object included in the image collected by the target tracking camera is not a person, switching the panoramic camera such that it serves as a video generating source and generating a video according to the images collected by the panoramic camera, in this way, different cameras can be switched automatically during the process of video recording, so that smoothly switched videos can be obtained, and there is no need to perform operation and manual intervention for the video generating system after installation and debugging are accomplished.

The Second Embodiment

FIG. 2 illustrates a flow chart of the implementation of the video generating method of the video generating system provided by the second embodiment of the present invention, the video generating system comprises a system target orientating camera, a target tracking camera and a panoramic camera, the method is described in detail as follows:

step 301, obtaining at least one image collected by the system target orientating camera;

step 302, comparing image frames of the images currently collected by the system target orientating camera with background frames, when the number of variable pixels in a currently obtained image exceeds a predetermined pixel number threshold value, judging that the current image includes a foreground object, wherein, the background frame is considered as an initial frame of the image collected by the system target orientating camera;

wherein, the background frame is an image frame which includes foreground object, herein, it is preferable that an initial frame of the image collected by the system target orientating camera is processed and is considered as the initial frame for making the initial frame be more close to a real background.

In the embodiment of the present invention, the image frames of the images obtained by the system target orientating camera are compared with the background frames, when being compared with the background figure, if the number of variable pixels in the currently obtained image exceeds the predetermined pixel number threshold value, it is determined that the currently obtained figure includes the foreground object; when the number of variable pixels in the currently acquired image doesn't exceed the predetermined pixel number threshold value, it is determined that the currently obtained image is still a background image.

Step 303, when a stay time of the foreground object remaining in a fixed position exceeds a predetermined stay time, determining that the foreground object is a target object, and executing step 304;

step 305, when a connectivity number of the pixels of the foreground object exceeds a predetermined connectivity number threshold value, determining that the foreground object is the target object, and executing step 306.

Step 304, adding the background object into background frame and refreshing a background frame.

In actual conditions, background continuously changes all the time, so background can be refreshed according to a predetermined time interval, in addition, the way of background refreshing directly affects the detection accuracy of target objects, especially for the scenes where target moves frequently, such as, a classroom scene where a teacher moves frequently, situations of refreshing mistakes may be prone to occur. In the embodiment of the present invention, when the connectivity number of the pixels of the foreground object exceeds the predetermined connectivity number threshold value, it means that the foreground object is large enough, and thus the foreground object may be a person, therefore, the foreground object is identified as the target object; when a stay time of the foreground object remaining in a fixed position exceeds the predetermined stay time value, it means that the foreground object is a new background object newly added into background, thus, the background object is refreshed into background frames, thereby avoiding a misidentification of considering background object as the target object.

Step 306, adding the background object into background frames and refreshing background frames;

wherein, according to the positions of the pixels where the target object lies in the lens of the system target orientating camera, the relationship between the pixels of the lens of the system target orientating camera are found out, and the visual angle of the target orienting camera, the visual angle of the position where the target object lies is determined.

Step 307, confirming the coordinate position where the target object lies in a current photographing space according to the visual angle of the position where the target object lies, the parameter of the current photographing space and the trigonometric function relationship.

In the embodiment, the space parameters may include a length, a width and a height of the current photographing space.

In the process of position determination, the system target orientating camera may be positioned to directly face the landscape view ready for photographing, the central point of the system target orientating camera is the focus point of vertical lines made by the system target orientating camera towards the landscape view, and an included angle between the object and the central point in horizon direction is obtained by the comparison of the visual angle of the system target orientating camera and the pixels. The target tracking camera is positioned at the place where it orientates the landscape view directly, and a holder of the target tracking camera is controlled to move towards the direction of the horizontal included angle. There may be a certain fixed offset between the holder and the orientated included angle, which can be calibrated manually in the process of the first debugging carried out by engineers.

Step 308, controlling the holder of the target tracking camera to move according to the coordinate position where the target object lies in the current space such that the target object can be tracked by the target tracking camera and the images collected by the target tracking camera can be obtained simultaneously.

in the embodiment, the images collected by the target tracking camera include the target object. By tracking for the target object, the target object can be further analyzed and whether the target object is a person can be determined accordingly.

Step 309, judging whether the target object included in the images collected by the target tracking camera is a person;

in this embodiment, the target object can be determined to be a person via human facial contour identification and/or skin color detection, by the adoption of human facial contour and skin color detection technology, whether the object to be tracked currently is a person or not can be identified, so that incorrect tracking and spurious triggering caused by some other disturbed targets can be avoided. Specifically, step 309 may comprise procedures in the following:

a. extracting lines of the target objects from the images collected by the target tracking camera;

wherein, the extracted lines is generally located at the place where light and dark cross or the edges of an object.

b. Sorting the lines by different types;

c. traversing different types of lines in sequence and combining the different types of lines after they are traversed;

d. when it is judged that the combined figure matches with a predetermined human face module, determining that the newly added target object is a human being.

In this embodiment, the lines can be sorted by different types according to their inclined angles, e.g., sorting all lines by the angles with the inclined angles of zero degree, forty five degrees, ninety degrees, one hundred and thirty five degrees, and so on. Firstly, all lines with the type of zero degree are traversed, the lines with the type of zero degree is then considered as original points, and other lines within a certain scope around the original points are traversed, whether the figure formed by the traversed lines matches with the predetermined human face module is finally judged, if yes, the current target object is judged as a person.

Step 310, when judging that the target object included in the image collected by the target tracking camera is a person and the person lies within the scope of the lens of the target tracking camera, switching the target tracking camera such that it serves as a video generating source and generating a videos according to the images collected by the target tracking camera;

step 311, when judging that the target object included in the image collected by the target tracking camera is a person and the person lies out of a scope of a lens of the target tracking camera, or when it is confirmed that the target object included in the image collected by the target tracking camera isn't a person, switching the panoramic camera such that it serves as a video generating source and generating a video according to the images collected by the panoramic camera.

In this embodiment, the system target orientating camera, the target tracking camera collects images, and image analysis are performed to determine whether the suspicious target is a person, so that the disturbances caused by some other objects is excluded, images collected by different cameras are controlled to switched automatically and thereby generates videos, so that accurate tracking for targets and correct switching among different cameras can be realized, and automatically switching in a video generating process is achieved, in this way, there is no need to perform operation and manual intervention after installation and debugging are accomplished.

The Third Embodiment

Figure 4:
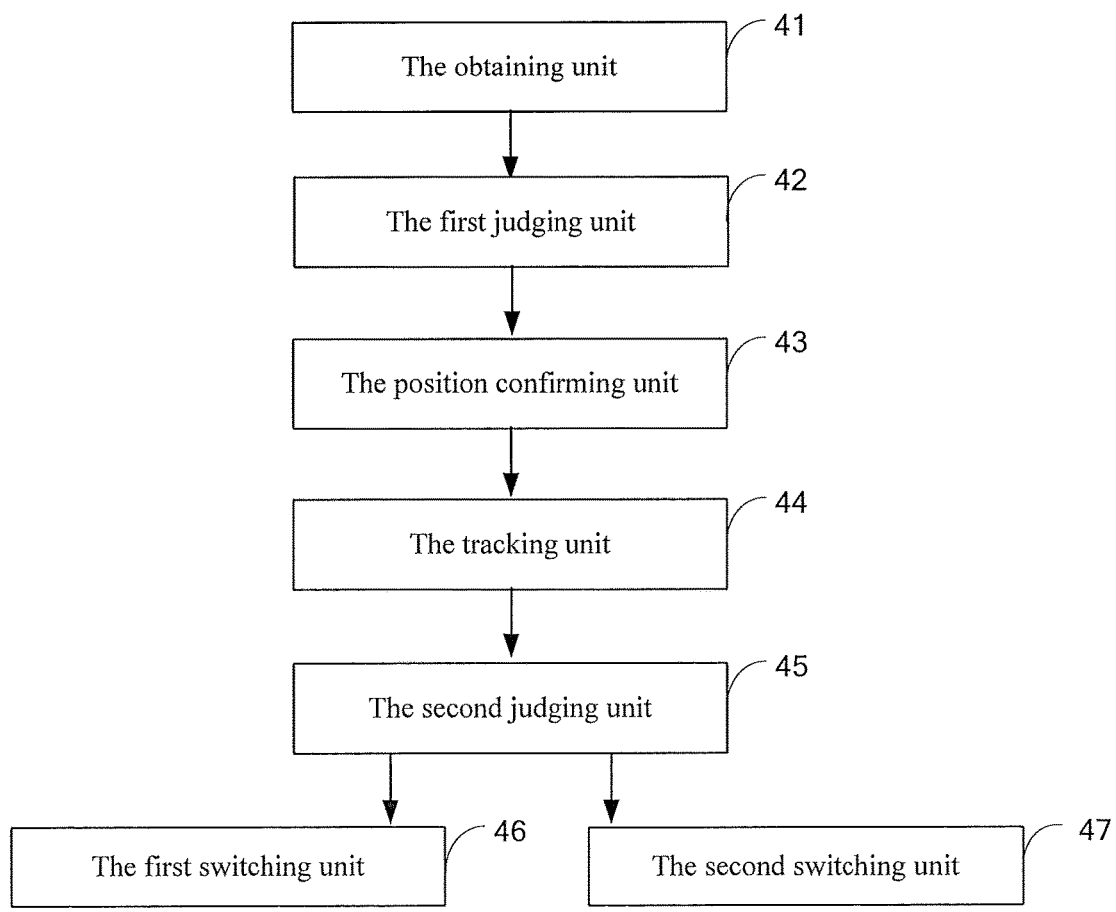
FIG. 4 illustrates a structural block diagram of a video generating apparatus of a video generating system according to a third embodiment of the present invention.

FIG. 4 illustrates a structural block diagram of a video generating apparatus provided by the third embodiment of the present invention, for convenient explanation, only the parts related to the embodiments of the present invention are illustrated.

The video generating apparatus of the video generating system comprises: an obtaining unit 41, a first judging unit 42, a position confirming unit 43, a tracking unit 44, a second judging unit 45, a first switching unit 46 and a second switching unit 47.

The obtaining unit 41 is configured for obtaining at least one image collected by a system target orientating camera;

the first judging unit 42 is configured for judging whether the image collected by the system target orientating camera includes a target object;

the position confirming unit 43 is configured for confirming a coordinate position where the target object lies in a current photographing space when the collected image includes the target object;

the tracking unit 44 is configured for controlling a holder of the target tracking camera to move according to the coordinate position for tracking the target object via the target tracking camera and obtaining at least one image collected by the target tracking camera simultaneously;

the second judging unit 45 is configured for judging whether the target object included in the image being collected by the target tracking camera is a person;

the first switching unit 46 is configured for switching the target tracking camera such that it serves as a video generating source and generating video according to the images collected by the target tracking camera when it is judged the target object included in the obtained images is a person, and the person lies within a scope of a lens of the target tracking camera;

the second switching unit 47 is configured for switching the panorama camera such that it serves as a video generating source and generating a video according to the images collected by the panorama camera when it is judged the target object included in the image collected by the target tracking camera is a person, and the person lies out of a scope of a lens of the target tracking camera, or when it is confirmed that the target object included in the images collected by the target tracking camera isn't a person.

In the embodiment of the present invention, automatically switching among different video sources is achieved, smoothly switched videos can be obtained, in this way, there is no need to perform operating and intervention for the video generating system after installation and debugging are accomplished.

The video generating apparatus of the video generating system provided by the present invention corresponds to the foregoing first method embodiment, for detailed explanation, please refer to the description of the first embodiment mentioned above, it is not repeated herein.

The Fourth Embodiment

Figure 5:
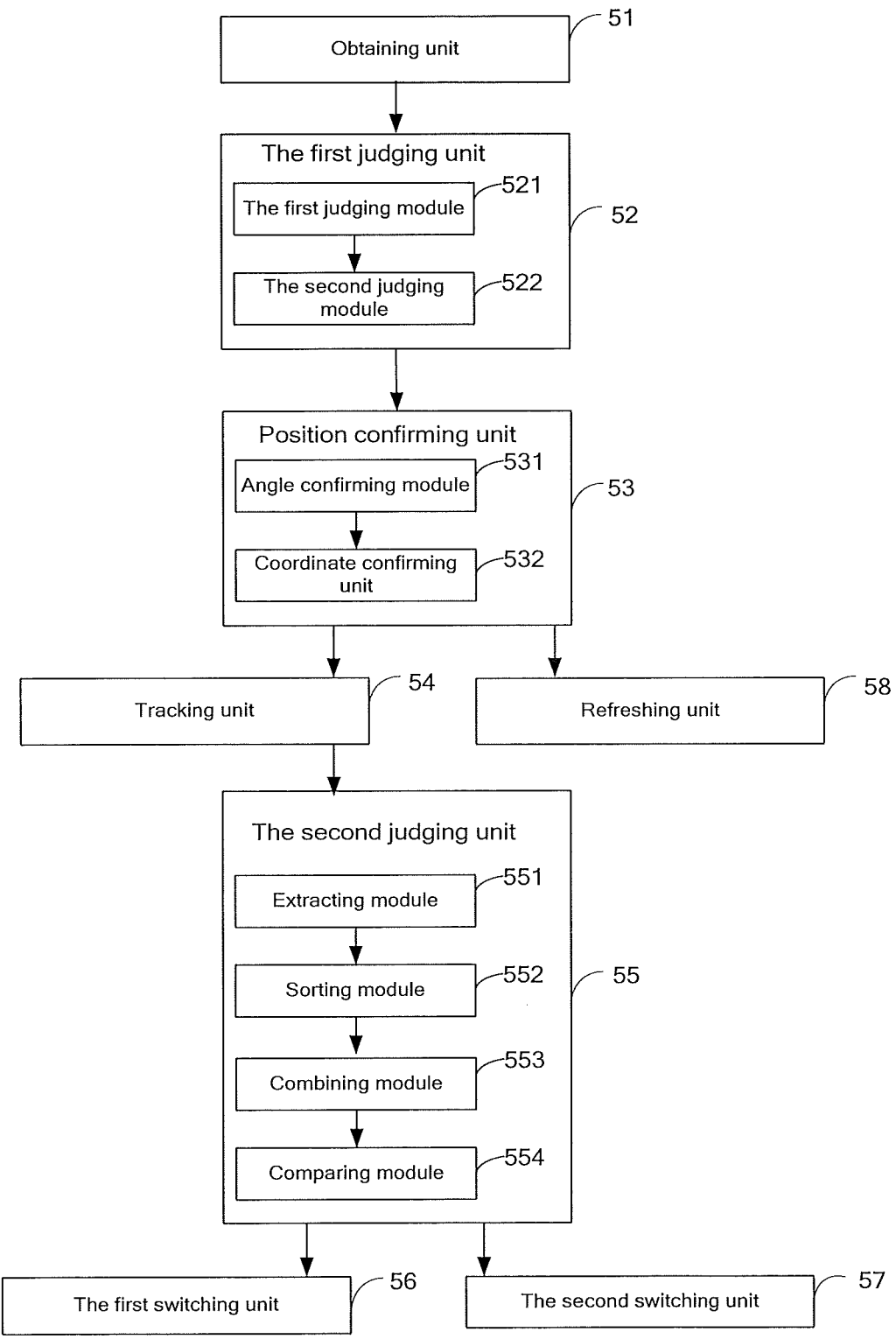
FIG. 5 illustrates a structural block diagram of a video generating apparatus of a video generating system according to a fourth embodiment of the present invention.

FIG. 5 illustrates a video generating apparatus of a video generating system provided by the fourth embodiment of the present invention, for convenient explanation, only the parts related to the embodiment of the present invention are illustrated.

The video generating apparatus of the video generating system comprises: an obtaining unit 51, a first judging unit 52, a position confirming unit 53, a tracking unit 54, a second judging unit 55, a first switching unit 56, a second switching unit 57 and a refreshing unit 58.

The first judging unit 52 comprises:

a first judging module 521 configured for comparing image frames currently obtained by the system target orientating camera with background frames, and judging that a current image includes a foreground object when the number of variable pixels in the currently obtained image exceeds a predetermined pixel number threshold value, wherein, a background frame is considered as initial frame of the image collected by the system target orientating camera;

a second judging module 522 configured for determining that a foreground object is a background when a stay time of the pixels of the foreground object remaining in a fixed position exceeds a predetermined stay time, and determining that the foreground object is a target object when a connectivity number of the pixels of the foreground object exceeds a predetermined connectivity number threshold value.

The video generating apparatus further comprises:

the refreshing unit 58 configured for adding a foreground into background frames and refreshing the background frames when confirming that the foreground is background.

The position confirming unit 53 comprises:

a angle confirming module 531 configured for confirming a visual angle where the target object lies according to the relationship between the pixels of the lens of the system target orientating camera and the visual angle of the system target orientating camera;

a coordinate confirming module 532 configured for confirming a coordinate position where the target object lies in a current photographing space according to the visual angle of the position where the target object lies, the parameter of the current photographing space and the trigonometric function relationship.

the second judging unit 55 comprises:

an extracting module 551 configured for extracting lines of the object in the image collected by the target tracking camera;

a sorting module 552 configured for sorting the lines by different types;

a combining module 553 configured for traversing the lines of different types by sequence and combining the lines of different types after they are traversed;

a comparing module 554 configured for determining that a newly added target object is a person when it is judged that the combined image matches with a predetermined human face module.

The video generating apparatus of the video generating system provided by the fourth embodiment of the present invention corresponds to the aforementioned second method embodiment, for detailed explanation, please refer to the description in the second embodiment mentioned above, it is not repeated herein.

It is worth being noted that all units incorporated in the above-mentioned apparatus embodiments and system embodiments are divided by function logic, but it is not limited to aforementioned way of dividing as long as relevant functions can be achieved. Besides, the specific names of various function units just aim at distinguishing from each other, but not the limitation to the scope of the present invention.

In addition, it can be understand to those skilled in the art that all procedures or a part of procedures for implementing the methods in foregoing embodiments can be accomplished via instructing relevant hardware by procedures, relevant procedures can be stored in a computer readable storage medium, the computer readable storage medium, such as, ROM (Read Only Memory)/RAM (Random Access Memory), magnetic disk, optical disk, and so on.

Foregoing contents are some preferable embodiments of the present invention merely, and are not regarded as being limitation to the present invention, those modifications, equivalent replacement, and improvement made within the spirit and the principle of the present invention should fall within the protection scope of the present invention.

The invention claimed is:

1. A video generating method of a video generating system, wherein the system comprises a system target orientating camera, a target tracking camera and a panorama camera, and the method comprises:

obtaining at least one image collected by the system target orientating camera;

judging whether the image collected by the system target orientating camera includes a target object;

when the collected image include the target object, confirming a coordinate position where the target object lies in a current photographing space;

controlling the holder of the target tracking camera to move according to the coordinate position such that the target object can be tracked by the target tracking camera and at least one image collected by the target tracking camera can be obtained simultaneously;

judging whether the target object included in the image collected by the target tracking camera is a person;

when it is judged that the target object included in the images collected by the target tracking camera is a person, and the person lies within a scope of a lens of the target tracking camera, switching the target tracking camera such that the target tracking camera serves as a video generating source and generating a video according to images collected by the target tracking camera;

when it is judged that the target object included in the image collected by the target tracking camera is a person, and the person lies out of a scope of a lens of the target tracking camera, or when confirming that the target object included in the images collected by the target tracking camera is not a person, switching the panorama camera such that the panorama camera serves as a video generating source and generating a video according to images collected by the panorama camera.

2. The method according to claim 1, wherein judging whether the image collected by the system target orientating camera include a target object comprises:

comparing an image frame currently collected by the system target orientating camera with a background frame, when the number of variable pixels in the currently collected image exceeds a predetermined pixel number threshold value, judging that the currently obtained image includes a foreground object; wherein, the background frame is considered as an initial frame of the image collected by the system target orientating camera;

when a stay time of the pixels of the foreground object remaining in a fixed position exceeds a predetermined stay time, determining that the foreground object is a background; when the connectivity number of the pixels of the foreground object exceeds a predetermined connectivity number threshold value, determining that the foreground object is the target object.

3. The method according to claim 2, comprising:

when it is confirmed that the foreground object is a background, adding the foreground object into background frames and refreshing the background frames.

4. The method according to claim 1, wherein confirming a coordinate position where the target object lies in the currently photographing space comprises:

confirming a visual angle of a position where the target object lies according to the relationship between the pixels of the lens of the system target orientating camera and visual angle of the system target orientating camera;

confirming the coordinate position where the target object lies in the currently photographing space according to the visual angle of the position where the target object lies, the parameter of the currently photographing space and the trigonometric function relationship.

5. The method according to claim 1, wherein judging whether the target object included in the image collected by the target tracking camera is a person comprises:
- extracting lines of the target object in the image collected by the target tracking camera;
- sorting the lines by different types;
- traversing the lines of different types by sequence and combining the lines of different types after they have been traversed;
- when it is judged that the combined image matches with a predetermined human face module, determining that the newly added target object is a person.

6. A video generating apparatus of video generating system, wherein the video generating apparatus comprises:
- an obtaining unit configured for obtaining at least one image collected by a system target orientating camera;
- a first judging unit configured for judging whether the image collected by the system target orientating camera includes a target object;
- a position confirming unit configured for confirming a coordinate position where the target object lies in a current photographing space when the collected image includes the target object;
- a tracking unit configured for controlling a holder of the target tracking camera to move according to the coordinate position such that the target object can be tracked by the target tracking camera and at least one image collected by the target tracking camera can be obtained simultaneously;
- a second judging unit configured for judging whether the target object included in the image collected by the target tracking camera is a person;
- a first switching unit configured for switching the target tracking camera such that the target tracking camera serves as a video generating source and generating a video according to images collected by the target tracking camera when judging that the target object included in the collected images is a person and the person lies within a scope of a lens of the target tracking camera;
- a second switching unit configured for switching the panorama camera such that the panorama camera serves as a video generating source and generating a video according to images collected by the panorama camera when judging that the target object included in the images collected by the target tracking camera is a person and the person lies out of a scope of a lens of the target tracking camera, or confirming that the target object included in the images collected by the target tracking camera is not a person.

7. The apparatus according to claim 6, wherein the first judging unit comprises:
- a first judging module configured for comparing an image frame currently collected by the system target orientating camera with a background frame, and judging that the current image includes a foreground object when the number of variable pixels in the currently collected image exceeds a predetermined pixel number threshold value, wherein the background frame is considered as an initial frame of the image collected by the system target orientating camera;
- a second judging module configured for determining that the foreground object is a background when a stay time of the pixels of the foreground object remaining in a fixed position exceeds a predetermined stay time, and determining that the foreground object is the target object when the connectivity number of the pixels of the foreground object exceeds a predetermined connectivity number threshold value.

8. The apparatus according to claim 7, comprising:
- a refreshing unit configured for adding a foreground into background frames and refreshing the background frames when it is confirmed that the foreground is a background.

9. The apparatus according to claim 6, wherein the position confirming unit comprises:
- an angel confirming module configured for confirming a visual angle where the target object lies according to the relationship between the pixels of the lens of the system target orientating camera and a visual angle of the system target orientating camera;
- a coordinate confirming module configured for confirming the coordinate position where the target object lies in a current photographing space according to the visual angle of the position where the target object lies, the parameter of the current photographing space and the trigonometric function relationship.

10. The apparatus according to claim 6, wherein the second judging unit comprises:
- an extracting module configured for extracting lines of the target object in the image collected by the target tracking camera;
- a sorting module configured for sorting the lines by different types;
- a combining module configured for traversing the lines of different types by sequence and combining the lines of different types after they have been traversed;
- a comparing module configured for determining that the newly added target object is a person when judging that the combined image matches with a predetermined human face module.

* * * * *